March 14, 1933.  N. CHRISTIE  1,900,898
ROTARY ENGINE
Filed May 28, 1932
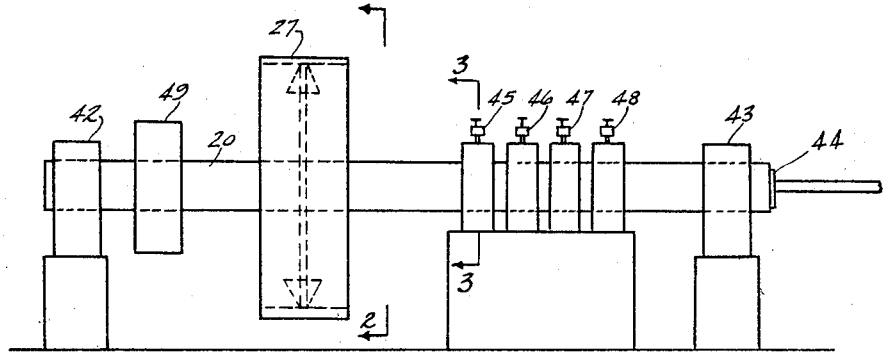
Fig. 1
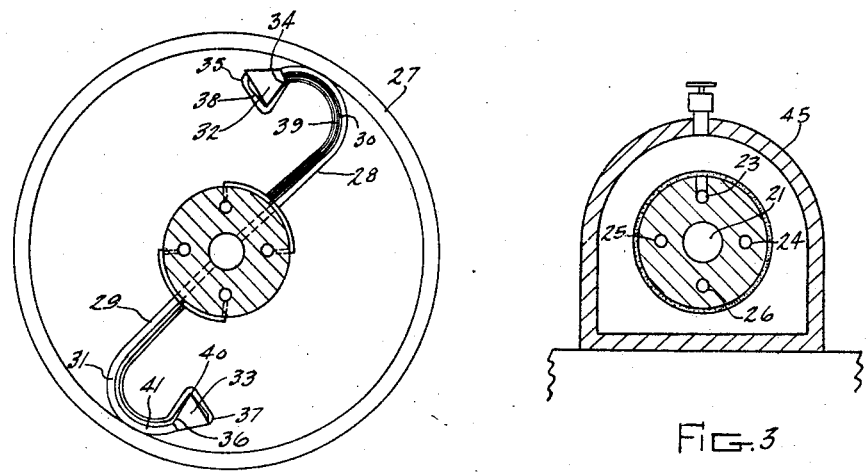
Fig. 2
Fig. 3
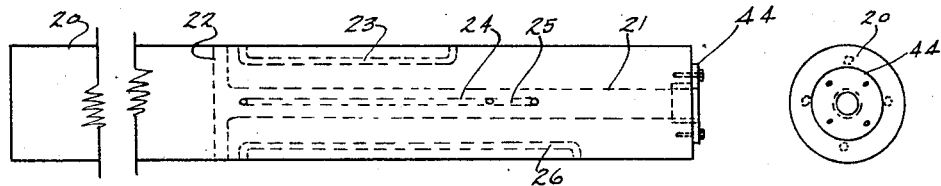
Fig. 4
Fig. 5
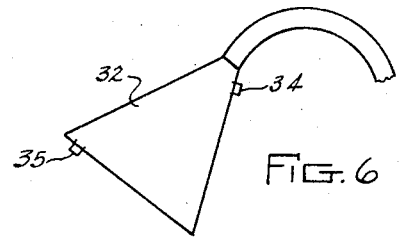
Fig. 6
INVENTOR
Neil Christie
By E. J. Fetherstonhaugh
ATTORNEY Patented Mar. 14, 1933

1,900,898

UNITED STATES PATENT OFFICE

NEIL CHRISTIE, OF LARDER LAKE, ONTARIO, CANADA

ROTARY ENGINE

Application filed May 28, 1932, Serial No. 614,114, and in Canada June 5, 1931.

The invention relates to a rotary engine, as described in the present specification and illustrated in the accompanying drawing which forms part of same.

The invention consists essentially in the way in which the impulses are directed radially from a hollow shaft and exhaust returns to passages in the same member as more particularly pointed out in the claims for novelty following a description containing an explanation in detail of an acceptable form of the invention.

The objects of the invention are to devise an engine that will be of comparatively few parts, all of which are easily accessible by the operator for repairs or other work; to construct an engine that can be efficiently operated by steam, or air or other fuel and which will be noiseless in operation; to eliminate the necessity of having gears and other mechanisms for reversing the motion of an engine; to avoid vibration and supply a uniform flow of the fuel to be used into the operating parts; and generally to provide an engine that is adaptable for marine, hoisting, mining, propelling and other purposes which will be comparatively cheap to manufacture, durable in construction and efficient for the purposes set forth.

In the drawing, Figure 1 is a side elevational view of the engine.

Figure 2 is a vertical sectional view taken on the lines 2—2 in Figure 1.

Figure 3 is a cross sectional view taken on the lines 3—3 in Figure 1 showing one of the valve controls.

Figure 4 is a fragmentary sectional view of the driving shaft showing the return passages for the exhaust as well as the main fuel inlet therein.

Figure 5 is an end view of the driving shaft showing the rotating ring.

Figure 6 is an enlarged detail of one of the expansion pockets.

Like numerals of reference indicate corresponding parts in the various figures.

Referring to the drawing, the rotary engine has the hollow driving shaft as indicated by the numeral 20 containing the fluid inlet passage 21 connected to a source of supply and has the radial passages 22 connecting the inlet passage 21 to its circumference. The driving shaft 20 also has a plurality of longitudinal exhaust passages 23 and 24, and 25 and 26. The fly wheel rim 27 is concentric with the shaft 20 in alignment with the radial passages 22 thereof. The feed pipes 28 and 29 are tapped to the radial passages 22 and extend to the inner circumference of the fly wheel rim and secured thereto by welding or other convenient methods and curved at 30 and 31 and terminate in the cups 32 and 33 forming the impulse members.

The impulse members or cups 32 and 33 each have exhaust openings 34 and 35, and 36 and 37, which are connected by means of the return pipe exhausts 38 and 39, and 40 and 41, to the longitudinal exhaust passages 23 and 24, and 25 and 26.

Each set of return pipe exhausts in the cups are placed diagonally to one another so that the inner exhaust openings will form the propulsion means for the rotation of the fly wheel in one direction and the outward exhaust openings will form the propulsion means for the rotation of the fly wheel in the opposite direction.

The standards 42 and 43 form journal members for the driving shaft and adjacent to the standard 43 is the packing ring 44 for preventing the escape of the steam or other fluid which is used for operating the engine.

The fluid from the exhaust passages within the driving shaft are controlled by means of the valves 45 and 46, and 47 and 48, each valve controlling one of the exhaust passages and which are in the form of housings which encircle the driving shaft adjacent to each of the openings from the longitudinal exhaust passages within the hollow shaft.

The actual drive shaft for operating the machinery or whatever the engine is to be used for is operated by a belt or other means which is connected to the pulley 49 and secured to the drive shaft 20.

In the operation of this particular form of engine, various kinds of fuel may be used such as steam, air, water or other liquid, which is forced into the feed inlet of the driving shaft by a suitable means and this fluid under pressure will penetrate into the feed pipes terminating in the cups. The pressure will begin to give impulses around the curve of these pipes and give their final impulse in the cups towards whichever of the exhaust port passages are opened, the latter being controlled by means of the valve mechanism which will close or open various return exhaust passages within the operating shaft.

It will therefore be seen that when it is desired to rotate the impellers in one direction, two of the valves will be closed which will immediately shut off the return exhaust fluid from one of each of the exhaust ports of the cups which form the final impulse action, leaving the other two valves open for allowing the fluid to escape from the remaining exhaust ports of the cups and when it is desired to reverse the rotation of the impellers, the valves are operated in a vice versa manner. It is of course understood that the actual apparatus for controlling the exhaust ports may be varied according to the various requirements or in certain cases it may be desired to rotate the impellers in one direction only and to control the reverse by a clutch or other mechanism.

What I claim is:

1. In an engine, a hollow shaft forming a fluid inlet and having longitudinal passages forming exhausts, a fly wheel rim concentric with said shaft, feed pipes tapping the hollow of said shaft and rigidly secured to said rim and curled outwardly therefrom, cups forming impulse members and secured to the curved ends of said pipes and having exhaust openings connected to said exhaust passages, and valves introduced in said exhaust passages and adapted to direct the impulse fluid into reverse contact with the cups.

2. In an engine, a hollow shaft forming a fluid inlet and having longitudinal passages forming exhausts, a fly wheel rim concentric with said shaft, a plurality of impellers having feed passages tapping the hollow of said rim and curved outwardly therefrom, cups forming impulse members and secured to the curled ends of said pipes and having exhaust openings diagonally opposite to one another and connected to said exhaust passages and valves introduced in said exhaust passages and adapted to direct the impulse fluid into reverse contact with the cups.

Signed at Kirkland Lake, Canada, this 7th day of April, 1932.

NEIL CHRISTIE.